3,655,690
1,2,3,5-TETRAMETHYL PYRAZOLIUM CHLORIDE AND METHOD FOR PREPARATION

Charles F. Hobbs, Des Peres, and James Dennis Wilson, University City, Mo., assignors to Monsanto Company, St. Louis, Mo.
No Drawing. Filed Nov. 8, 1968, Ser. No. 774,501
Int. Cl. C07d 49/18
U.S. Cl. 260—310 R  2 Claims

---

ABSTRACT OF THE DISCLOSURE

The invention relates to the preparation of various amide type compounds including amides, amidinium salts, vinylogous amidinium salts and endiamines. The compounds are prepared from carboxyl compounds by a reaction with an amine in the presence of a metal halide. The compounds of the invention have utility in the production of various nitrogen compounds and as biologically active materials, as antioxidants and acid scavengers.

---

The present invention relates to the preparation of various amide type compounds including amides, amidinium salts, vinylogous amidinium salts and endiamines. It is an object of the invention to prepare these products by a novel process employing inexpensive starting materials.

The compounds contemplated in the present invention have the general formula R—Z where Z is selected from the group consisting of

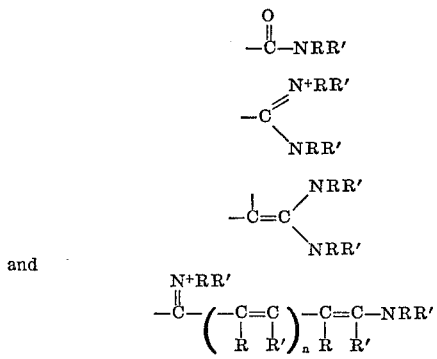

and

In this formula, $n$ is a whole number from zero to 5 and R and R' are the same or different members of the class consisting of hydrogen, alkyl and alkenyl radicals having from 1 to 20 carbon atoms, including straight chain and branched chain alkyl, alkenyl, cycloalkyl, cycloalkenyl, for example, methyl, ethyl, propyl, isopropyl, butyl, isobutyl, secondary butyl, tertiary butyl, pentyl, hexyl, cyclohexyl, heptyl, octyl, nonyl, and decyl radicals and aryl radicals having from 6 to 30 carbon atoms, for example, tolyl, xylyl, naphthyl and anthracyl radicals. The group of R and R' also includes the polycyclic radicals of the class having from 6 to 30 carbon atoms, for example, tolyl, xylyl, naphthyl and anthracyl radicals. The group of R and R' also includes the polycyclic radicals of the class having from 6 to 30 carbon atoms and being selected from polycyclic radicals, steroids and terpenes, for example, indanyl, cholesteryl, and camphyl. The above radicals may be unsubstituted or substituted such as with cyano or halogeno substituents.

BACKGROUND OF THE INVENTION

It has long been recognized that the preparation of amides from the corresponding acid ammonium salts requires strong heating; the present process represents an improvement in that it can be carried out under mild conditions of temperature, allowing thermally labile amides to be prepared. Other known methods of preparing amides require the conversion of the acid to an active derivative, e.g., an acid chloride, which will react with the amine at mild temperatures. There is presently no method known for preparing amidinium salts directly from an acid plus an amine.

SUMMARY OF THE INVENTION

It has been found that the preparation of amide compounds, including amides, amidinium salts, vinylogous amidinium salts and endiamines, is readily carried out by the reacting of a carboxyl or vinylogous carboxyl compound, for example, an acid or salt with an aminating reagent providing a primary or secondary amine group, this reagent being selected from the group consisting of (a) tris (mono or (disubstitutedamino) halo metal and bis(mono) or disubstitutedamino) halo metal compounds, the halo substituent being chlorine, bromine or iodine, and (b) the combination of a metal halide (e.g., the chloride, bromide or iodine) with an amine, RR'NH, where R and R' are defined above.

The carboxyl compounds which are employed in the practice of the present invention have the general formula, R—Y, where Y is —C(O)—OM, or

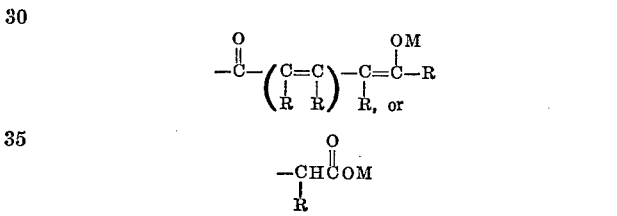

where the symbols have the meanings defined above. M is selected from the class of atoms and radicals consisting of hydrogen; positive metals, including Li, Na, K, Ca, Ba, Al, etc.; and ammonium radicals of the dialkyl, $R_2{}^+NH_2$; trialkyl, $R_3{}^+NH$; and tetraalkyl, $R_4{}^+N$ types. Other radicals which are included are ammonium radicals in which the alkyl substituents are joined in ring, such as N-alkyl pyridinium and -substituted pyridinium, tetrasubstituted phosphonium, -arsonium and -stibonium, and ferricinium.

In the above described metal compounds, the said metal is generally used in its highest valence state, employed singly or in combination, being selected from the group consisting of titanium, iron, aluminum, tin, arsenic, antimony, zirconium, hafnium, ruthenium, osmium, gallium, germanium, lead, bismuth, scandium, vanadium, yttrium, and niobium. A preferred group consists of titanium, iron, aluminum, tin, arsenic, antimony, zirconium, hafnium, ruthenium, osmium, gallium, germanium, lead and bismuth. A more preferred group consists of titanium, iron, aluminum, tin, arsenic and antimony.

DESCRIPTION OF THE PREFERRED EMBODIMENT

Thus, in one embodiment of the invention compound, the amination of the carboxyl is accomplished by the use of a primary or secondary amine in combination with a metal halide, e.g., titanium tetrachloride or aluminum trichloride. The use of the metal halides provides the advantage of readily available, inexpensive starting materials.

The products of the present invention have the formula R—Z, as defined above. Specific types of compounds within this general formula include amides having the general formula

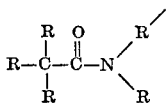

amidinum salts having the general formula

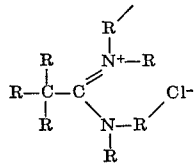

endiamines having the general formula

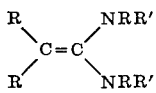

and vinylogous amidinium ions having the general formula

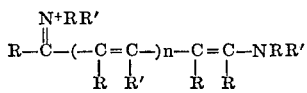

The process of preparing the present compounds comprises admixing an amine component selected from the group of (a) tris, di or mono substitutedamino, halo metal and bis, or disubstitutedamino, halo metal compounds, or (b) the combination of a metal halide e.g., the chloride, bromide or iodide, with a primary or secondary amine RR'NH, where R and R' are defined above, and a carboxyl compound having the general formula, RY as defined above. The amine components are used in approximately stoichiometric proportions, although an excess may be employed if desired.

Examples of the amine component defined above, which may be supplied by the use of an aminohalo metal compound, for example bis (didecylamino) dichlorotitanium or ethylaminotrichloro titanium, or mono (dimethylamino) dibromoantimony, propylaminodichloroaluminum. Still another combination which serves to introduce the amine component is the combination of a metal halide with a secondary amine, for example, tin tetrachloride or aluminum tribromide used together with pyrrolidine.

The reaction is conducted at a temperature of from —50° C. to 150° C., a preferred temperature range being from 0° C. to 60° C. The pressure imposed upon the system is not a critical variable, but may be varied as convenient in the range of from atmospheric pressure to 100 pounds per square inch. It is not necessary to employ a solvent in carrying out the invention, although a nonreactive solvent, for example, an ether, e.g., ethyl ether, tetrahydrofuran, dioxane, or bis (2-methoxy-ethyl) ether is convenient. Other solvents which are representative include hydrocarbons, for example, benzene, pentane, toluene and hexane.

The following examples illustrate specific embodiments of the present invention.

Example 1

Preparation of N,N-diethylbenzamide.—To a suspension of 5.76 gm. (0.04 mole) of sodium benzoate in a solution of 7.3 gm. (0.1 mole) diethylamine in 300 ml. hexane there is slowly added 3.8 gm. (0.02 mole) titanium tetrachloride. After allowing the mixture to warm to 25° C. and stir at that temperature for 20 hours, the reaction mixture is filtered and solvent removed from the filtrate. Distillation of the residue yields N,N-diethylbenzamide, B.P. 75° C./1 mm. Hg (lit. value 175° C./ 35 mm. Hg). The NMR spectrum ($CCl_4$ solution, tetramethylsilane (TMS) internal standard) exhibits a broad singlet at tau 2.7, a quartet at tau 6.7, and a triplet at tau 8.9 in the expected area ratios of 5:8:12, respectively. The mass spectrum exhibits a molecular ion at 177 (required for $C_{11}H_{15}NO$, m/e=177) and a cracking pattern in accord with the structure.

Example 2

Preparation of N-ethylformamide.—To a solution of 3.7 gm. (0.08 mole) formic acid and 9 gm. (0.2 mole) ethylamine in 600 ml. tetrahydrofuran (THF), stirred and kept at —70° C., is slowly added, neat and in small portions, 7.6 gm. (0.04 mole) titanium tetrachloride. After allowing the mixture to warm to 25° C. and stir at that temperature for 4 hours, it becomes colorless. The reaction mixture is filtered and the solvent removed from the filtrate. Distillation of the residue yields 5.05 gm. (89% yield at 100% conversion) of N-ethylformamide, B.P 95° C./12 mm. Hg (lit. value, 199° C.). The mass spectrum exhibits a molecular ion at m/e=73 (required for $C_3H_7NO$, m/e=73) and a cracking pattern in accord with the structure. The NMR spectrum ($CCl_4$ solution, TMS internal standard) exhibits a singlet at tau 1.8, a broad singlet at tau 5.0, an overlapped doublet of quartets at tau 6.6 and a triplet at tau 8.7, in the expected area ratio of 1:1:2:3, respectively.

Example 3

Preparation of N,N'-bis(tetramethylene)malonamide.—To a solution of 2.08 gm. (0.02 mole) malonic acid and 10.65 gm. (0.15 mole) pyrrolidine in 100 ml. tetrahydrofuran (THF), kept at —70° C. and stirred, is added slowly 3.8 gm. (0.02 mole) titanium tetrachloride. After allowing the mixture to warm to 25° C. and stir at that temperature for 48 hours, the mixture is filtered. The precipitate is washed with THF; the filtrate and washings are combined and solvent is removed. The residue is recrystallized from $CCl_4$ to give 2.77 gm. (66% yield based on 100% conversion) of N,N'-bis(tetramethylene) malonamide, M.P. 109–110° C.

Analysis gives: Calculated for $C_{11}H_{18}N_2O_2$: 62.83% C, 86.2% H. 13.33% N; mol. wt 210. Found: 62.66% C, 8.65% H, 13.35% N. The mass spectrum exhibits a molecular ion at m/e=210 and a cracking pattern in accord with the structure. The NMR spectrum ($CD_3CN$ solution, TMS internal standard) exhibits a complex multiplet centered at tau 6.4 overlapping a singlet at tau 6.5 and a complex multiplet at tau 8.0 in the expected area ratio of 10:8, respectively. The same compound is also prepared by the use of bis(pyrrolidinyl) arsenic$^{II}$ chloride with disodium malonate in acetonitrile solution.

Example 4

Preparation of N-pivaloylpyrrolidine.—To a solution of 5.1 gm. (0.05 mole) pivalic acid and 14.2 gm. (0.20 mole) pyrrolidine in 200 ml. toluene, kept at —70° C. and stirred, is added 4.75 gm. (0.025 mole) titanium tetrachloride, slowly in small portions. The reaction mixture is allowed to warm to 25° C. and is stirred at that temperature for 7 days. Water (1 ml.) is added, and the resulting mixture filtered. Solvent is removed from the filtrate and the residue is sublimed under vacuum to yield 2.40 gm. (31% yield based on 100% conversion) of N-pivaloylpyrrolidine, M.P. 56–59° C.

Analysis gives: Calculated for $C_9H_{17}NO$: 69.62% C, 11.06% H, 9.02% N; mole. wt. 155. Found: 69.41% C, 11.03 %H, 8.79% N.

The mass spectrum exhibits a molecular ion at m/e= 155 and a cracking pattern consistent with the structure. The NMR spectrum ($CCl_4$ solution, TMS internal standard) exhibits a complex multiplet centered at tau 6.5, a complex multiplet centered at tau 8.2 and a sharp singlet at tau 8.8, in the expected area ratio of 4:4:9, respectively.

Example 5

Preparation of tetramethyloxamide.—To 7.6 gm. (0.04 mole) titanium tetrachloride frozen in the bottom of a heavy walled bottle is added carefully, at −70° C., 3.60 gm. (0.04 mole) oxalic acid and 50 ml. (excess) dimethylamine. This mixture is allowed to warm very slowly in the stoppered bottle, and is kept at 40° C. for 48 hours. The bottle is then cooled well in ice, opened, and 1 ml. water and 100 ml. THF are added. This mixture is allowed to warm to 25° C., is filtered and the precipitate is washed with several portions of THF. The filtrate and washings are combined, and the solvent evaporated to leave the crude product which is recrystallized from THF, yielding 4.20 gm. (73% based on 100% conversion) of tetramethyloxamide, M.P. 79–80° C. (lit. value, 81° C.). The NMR spectrum (CDCl$_3$ solution, TMS internal standard) exhibits only the epected singlet at tau 7.05.

The supperiority of the present method is shown against the preparation of this amide from the reaction of dimethylamine with oxalyl chloride, in which a yield of 17% (based on 100% conversion of oxalyl chloride) is obtained.

Example 6

Preparation of 1-formyl-1,2-dimethylhydrazine.—To a suspension of 13.3 gm. (0.1 mole) of 1,2-dimethylhydrazine dihydrochloride in a solution of 9.2 gm. (0.2 mole) formic acid and 70.7 gm. (0.70 mole) triethylamine in 600 ml. THF, kept at −75° C. and stirred, is added, neat and in small portions, 19.0 gm. (0.1 mole) titanium tetrachloride. The mixture is allowed to warm to 25° C. and is kept at that temperature for 7 days, after which time 2 ml. water is added, and the mixture is filtered. The precipitate is washed with tetrahydrofuran; the filtrate and washings are combined and the solvent evaporated. The residue is fractionally distilled under vacuum to yield 2.50 gm. (24% based on 100% conversion of hydrazine) of 1-formyl-1,2-dimethylhydrazine, B.P. 72° C./8 mm. Hg. The mass spectrum exhibited a molecular ion at m/e=88 (required for C$_3$H$_8$N$_2$O, M.W.=88) and a cracking pattern consistent with the formulation. The NMR spectrum (CDCl$_3$ solution, TMS internal standard) exhibited singlets at tau 1.8 and 2.1, a broad singlet at tau 5.3, and singlets at tau 6.95 and tau 7.00 and at tau 7.40 and tau 7.45 in the area ratio expected for a 3:1 cis-trans ratio of isomers of 3:1:4:3:9:9:3 (by groups, 1:1:3:3), respectively. The infrared spectrum exhibits bands at 3500 and 1690 cm.$^{-1}$.

A high boiling fraction from this reaction yields 1.50 gm. (14%) 1,2-diformyl-1,2-dimethyl hydrazine. The mass spectrum exhibits a molecular ion at m/e=116 (C$_4$H$_8$N$_2$O$_2$ requires m/e=116) and a cracking pattern consistent with this structure. The NMR spectrum is complicated but consistent with this structure. The infrared spectrum exhibits a band at 1700 cm.$^{-1}$ but no band near 3500 cm.$^{-1}$.

Example 7

Preparation of formanilide.—To a solution of 11.2 gm. (0.12 mole) aniline and 1.84 gm. (0.04 mole) formic acid in ether, kept cold, is added 3.8 gm. (0.02 mole) titanium tetrachloride. The mixture is allowed to warm to room temperature, and stir at that temperature for six hours. The reaction mixture is filtered and solvent stripped from the filtrate. The residue is fractionally distilled to yield formanilide, M.P. 46–47° C. (literature value, 47.5° C.). The NMR spectrum (CCl$_4$ solution, TMS internal standard) exhibits a complex series of resonances between tau 1.8 and tau 3.0.

Example 8

Preparation of vinylidenebisdimethylamine.—To a solution of 48.7 g. (0.56 mol) of N,N-dimethylacetamide in 300 g. (6.67 mol) of dimethylamine, kept cold by a bath of Dry Ice, is added dropwise with stirring a solution of 68.4 g. (0.36 mol) of titanium tetrachloride in 100 ml. of pentane. The mixture is allowed to warm to reflux temperature (Dry Ice condenser) and then is stirred for an additional 8 hr. The mixture again is cooled with Dry Ice and 200 ml. of pentane is added. The cold mixture is filtered in an atmosphere of dry nitrogen, and the filter cake washed repeatedly with pentane. The combined filtrates are distilled to obtain 24.8 g. (39%) of vinylidenebisdimethylamine; B.P. 115° (750 mm.); $n_D^{25}$ 1.4502. [lit. B.P. 115° C., $n_D^{25}$ 1.4500]. The NMR spectrum is identical to that of an authentic sample.

The dry filter cake, 147.0 g., is stirred with an additional 300 g. (6.67 mol) of dimethylamine at reflux for 4 hr. and then the mixture is filtered as above. Distillation gives an additional 6.9 g. (11%) of vinylidenebismethylamine.

The same compound is also prepared by the action of (dimethylamino) titanium trichloride on sodium acetate in the presence of dimethylamine.

Example 9

Preparation of propenylidenebismethylamine.—In a 250 ml. pressure bottle are placed 5.05 g. (0.05 mol) N,N-dimethylpropionamide and 5.3 g. (0.028 mol) of titanium tetrachloride. The bottle and contents are cooled to Dry Ice temperature and 18 g. (0.40 mol) of anhydrous dimethylamine are added cautiously. The mixture is allowed to warm to room temperature and stand overnight with occasional shaking. The mixture is cooled in Dry Ice, 20 ml. of cold, dry pentane is added and the mixture is filtered. The salt cake is washed with pentane and allowed to dry. NMR spectroscopy (in CH$_2$Cl$_2$) revealed N,N,N',N'-tetramethylpropionamidinium salt and dimethylammonium halide. The salt cake is placed in a distilling flask with 50 g. of 1,5-diazobicyclo-[4.3.0]-nonene-5 and the mixture is heated to 100° under nitrogen whereupon the salt cake dissolved and dimethylamine is evolved. The product then is distilled into a Dry Ice cooled receiver up to a pot temperature of 140° C. (10 mm.). Redistillation affords 4.5 g. (70%) of propenylidenebisdimethylamine: B.P. 52° C. (33 mm.), $n_D^{25}$ 1.4567 [lit.—B.P. 74° C. (80 mm.), $n_D^{25}$ 1.4552]. The NMR spectrum is identical to that of an authentic sample.

Example 10

Preparation of octamethyloxamidinium chloride.—To 7.6 gm. (0.04 mole) titanium tetrachloride frozen in a pressure bottle is added carefully 5.56 gm. (0.04 mole) tetramethyloxamide and 50 ml. dimethylamine, carefully, and while kept cold. The bottle is stoppered and allowed to warm very slowly to 40° C. with occasional agitation, at which temperature it is kept for 7 days. The bottle is then cooled well in ice, opened, and allowed to warm back to room temperautre. Tetrahydrofuran is added, and the reaction mixture is filtered. The precipitate is extracted with hot acetonitrile, and the solvent evaporated. Fractional crystallization separates octamethyloxamidinium chloride from the by-products. The NMR spectrum (CD$_3$CN solution, TMS internal standard) exhibits two singlets at tau 6.7 and tau 7.1 in the expected 1:1 area ratio.

Example 11

Preparation of 2,2 - dichlorovinylidenebis(dimethylamine).—To a solution of 15.6 gm. (0.1 mole) N,N-dimethyldichloroacetamide and 41.0 gm. 0.9 mole) dimethylamine in 100 ml. ether, kept cold and stirred, is added 8.8 gm. (0.05 mole) titanium tetrachloride. The mixture is allowed to warm to 25° C. and stir at that temperature for 72 hours. The reaction mixture was filtered and the precipitate washed several times with ether; the solvent is evaporated and the residue distilled to yield 6.3 gm. (33% based on 100% conversion of amide) of dichlorovinylidenebis(dimethylamine), B.P. 46°/2 mm. Hg (literature value, 55°/3 mm. Hg). The NMR spectrum (benzene solvent, TMS internal standard) shows only the expected singlet at tau 7.6.

Example 12

Preparation of 2-phenylvinylidenebisdimethylamine.—To a mixture of 8.15 g. (0.05 mol) of N,N-dimethylphenylacetamide, 5.3 g. (0.028 mol) of titanium tetrachloride and 20 ml. of dry pentane contained in a 250 ml. pressure bottle and cooled to Dry Ice temperature is added slowly 18 g. (0.40 mol) of cold, dry dimethylamine. The bottle is sealed and the contents allowed to warm to room temperature and stand for 48 hr. The mixture is cooled, filtered, and the filter cake washed with pentane. The combined filtrate is distilled to obtain 4.7 g. (50%) of 2-phenylvinylidenebisdimethylamine, B.P. 60–62° C. (0.2 mm.); $n_D^{25}$ 1.5889 [lit.—B.P. 80 (0.9 mm.); $n_D^{25}$ 1.5905]. The NMR spectrum is identical to that of an authentic sample.

Example 13

Preparation of 1,3-dimethyl - 2 - phenylimidazolinium chloride.—To a solution of 6.1 gm. (0.05 mole) benzoic acid and 17.6 gm. (0.20 mole) N,N'-dimethylethylenediamine in THF, cold, is added 18.0 gm. (0.22 mole) $TiCl_4$ in small portions. The mixture is allowed to warm to room temperature, and stir at that temperature for 4 days. The mixture is filtered, and the filter cake extracted with hot dichloromethane. Removal of solvent from the extractate leaves a solid which is recrystallized from acetone to yield 3.2 gm. (31% based on 100% conversion of benzoic acid) of 1,3-dimethyl-2-phenylimidazolinium chloride. The NMR spectrum ($CD_3CN$ solvent, TMS internal standard) exhibits a complex multiplet centered at tau 2.3, a singlet at tau 5.9, and a singlet at tau 7.0, in the expected 5:4:6 area ratio, respectively.

Example 14

Preparation of N,N - dimethyl - 4 - dimethylamino-3-penten-2-immonium chloride'.—To a solution of 10 gm. (0.1 mole) acetylacetone and 45 gm. (1 mole) dimethylamine in 150 ml. cold pentane is added a solution of 19 gm. (0.1 mole )$TiCl_4$ in 100 ml. pentane, at a rate slow enough to keep the temperature of the reaction mixture below −10° C. This mixture is allowed to warm to 25° and stir for 18 hours. The mixture is filtered and washed and the precipitate extracted with several portions of hot acetonitrile which are combined and allowed to cool. The acetonitrile solution is washed with a saturated aqueous $K_2CO_3$ solution, dried, and evaporated to dryness. The residue is recrystallized from $CH_2Cl_2$-ether to give 14.7 gm. (78% yield based on 100% conversion of acetylacetone) of N,N-dimethyl - 4 - dimethylamino-3-penten-4-immonium chloride as hygroscopic cubic crystals, M.P. 230° C. (dec.). The ultraviolet spectrum (acetonitrile solution) exhibits bands at 221 and 344 millimicrons (literature values, 222, 345 milicrons). The NMR spectrum ($CH_3CN$ solution, TMS internal standard) exhibits singlets at tau 5.15, tau 6.90, and tau 7.85 in the expected area ratios of 1:12:6, respectively.

The superiority of the present method is shown by the preparation of this salt (as the perchlorate) from acetylacetone, dimethylamine, and dimethylsulfate in four steps, with an overall yield of 64%.

Example 15

Preparation of 1,2,3,5 - tetramethylpyrazolium chloride.—To a suspension of 2.66 gm. (0.02 mole) 1,2-dimethylhydrazine dihydrochloride in a solution of 2.0 gm. (0.02 mole) acetylacetone and 10.1 gm. (0.1 mole) triethylamine in 100 ml. THF is added 3.8 gm. $TiCl_4$, keeping the temperature of the reaction mixture below −10° C. The mixture is allowed to warm to 25° C. and stir at that temperature for 4 days. The mixture is filtered, and the precipitate extracted with hot $CH_3CN$. The resulting solution is allowed to cool, is treated with a saturated aqueous $K_2CO_3$ solution, dried, and evaporated to dryness. From the residue 1,2,3,5 - tetramethylpyrazolium chloride can be isolated by recrystallization from $CH_2Cl_2$ M.P. 255° (dec.). The NMR spectrum ($CD_3CN$ solution, TMS internal standard) exhibits singlets at tau 3.6, tau 6.2, and tau 7.7 in the epected area ratio of 1:6:6, respectively.

Example 16

Preparation of 1,4 - dimethyl - 1,2,3,4 - tetrahydrocyclohepta[b]pyrazinium hexafluorophosphate.—To a cold suspension of 12.2 gm. (0.1 mole) tropolone in a solution of 35.2 gm. (0.4 mole) N,N' - dimethylethylenediamine in 500 ml. ether is added 19 gm. (0.1 mole)

$TiCl_4$ in small portions. The mixture is allowed to warm to 25° C., and stir at that temperature for 5 days, then it is heated to 40° C. and allowed to stir at that temperature for 1 additional day. The mixture is then filtered and exhaustively extracted with $CH_2Cl_2$. This solution is evaporated to dryness and the residue taken up in hot methanol to give a solution to which is added a saturated solution of 16.8 gm. (0.1 mole) $NaPF_6$ in hot methanol. On cooling 1,4 - dimethyl - 1,2,3,4 - tetrahydrocyclohepta[b]pyrazinium hexafluorophosphate crystallized out, M.P. 215° C. (dec.). A second crop can be obtained by evaporating the mother liquor to dryness, extracting the residue with $CH_2Cl_2$, and recrystallizing the material thus obtained. Yield, 8.80 gm. (27.5% based on 100% conversion of tropolone). The NMR spectrum ($CD_3CN$ solution, TMS internal standard) exhibits a complex multiplet centered at tau 2.6 and singlets at tau 6.0 and tau 6.4 in the expected area ratio of 5:4:6, respectively. The ultrviolet spectrum ($CH_3CN$ solution) exhibits bands at 221, 266, 360, and 438 millimicrons.

Example 17

Preparation of N - cyclohexylabietamide.—To a cold solution of 3.02 gm. (0.01 mole) abietic acid and 3.0 gm. (0.03 mole) cyclohexylamine in THF then was added 0.95 gm. (0.005 mole) titanium tetrachloride. The mixture is allowed to react at 25° C. for 48 hours. The product is N-cyclohexylabietamide.

Example 18

Preparation of N-decyl linolenamide.—To a cold solution of sodium linolenate (3.00 gm., 0.01 mole) and decylamine (3.14 gm., 0.02 mole) in THF is added aluminum chloride (0.88 gm., 0.0067 mole). The mixture is allowed to react at 35° C. for 48 hours, and the product, N-decyl linolenamide, is isolated by distillation.

The amides of the present invention are useful in the production of tertiary amines, for example by reduction:

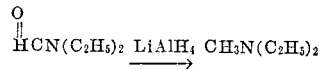

are also useful intermediates in the preparation of amidines, endiamines and amidinium salts. Certain compounds have utility as biologically active materials, e.g., as herbicides.

The endiamines of this invention find utility in the preparation of amidinium salts, e.g., by alkylation:

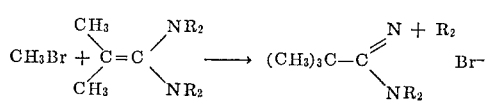

They are also useful as antioxidants, acid scavengers, etc.

The amidinium salts of this invention are useful in the preparation of amides, by hydrolysis; and in the preparation of ketones and aldehydes. For example,

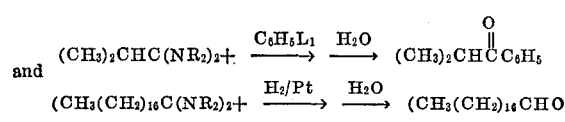

The vinylogous amidinium salts of this invention are useful as additives to polymer products, e.g., as antistatic agents and photodegradation inhibitors. They are also useful in the preparation of complex amines, e.g., by reduction:

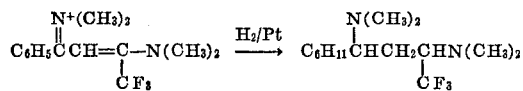

What is claimed is:
1. The compound 1,2,3,5-tetramethylpyrazolium chloride.
2. Process for the preparation of 1,2,3,5-tetramethylpyrazolium chloride which comprises admixing dimethylhydrazine dihydrachloride together with triethylamine at a temperature of about 25° C. in the presence of titanium tetrachloride and thereafter removing the aforesaid product.

References Cited
UNITED STATES PATENTS 3,471,492   10/1969   Johnston _____ 260—250
1,879,210   9/1932   Mahl _____ 260—310 R NICHOLAS S. RIZZO, Primary Examiner U.S. Cl. X.R.

424—269, 250; 252—401; 260—250 R, 551 R, 583 B, 558 R, 561 R, 326.3, 583 J, 309.6